United States Patent
Zhang et al.

(10) Patent No.: US 12,292,330 B2
(45) Date of Patent: May 6, 2025

(54) SPECTROMETRY APPARATUS

(71) Applicant: Hitachi High-Tech Corporation, Tokyo (JP)

(72) Inventors: Kaifeng Zhang, Tokyo (JP); Masahiro Watanabe, Tokyo (JP); Takenori Hirose, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 165 days.

(21) Appl. No.: 18/131,508

(22) Filed: Apr. 6, 2023

(65) Prior Publication Data

US 2023/0332950 A1    Oct. 19, 2023

(30) Foreign Application Priority Data

Apr. 18, 2022    (JP) .................................. 2022-068154

(51) Int. Cl.
*G01J 3/10*    (2006.01)
*G01J 3/02*    (2006.01)

(52) U.S. Cl.
CPC .............. *G01J 3/021* (2013.01); *G01J 3/0208* (2013.01); *G01J 3/0229* (2013.01); *G01J 3/10* (2013.01); *G01J 2003/102* (2013.01)

(58) Field of Classification Search
CPC ........ G01J 3/021; G01J 3/0208; G01J 3/0229; G01J 3/10; G01J 2003/102; G01J 3/0205; G01J 3/0237; G02B 17/061; G02B 27/0927

USPC .......................... 356/326, 445, 328, 369, 636
See application file for complete search history.

(56) References Cited

U.S. PATENT DOCUMENTS

| | | | | |
|---|---|---|---|---|
| 2001/0006419 A1* | 7/2001 | Hallmeyer | ......... | G01B 11/0641 356/369 |
| 2005/0270611 A1* | 12/2005 | Oshiro | ................. | G02B 21/244 713/186 |
| 2008/0285026 A1* | 11/2008 | Okawauchi | ............ | G01N 21/55 356/300 |
| 2013/0215428 A1* | 8/2013 | Ishimaru | ................. | G01J 3/021 356/451 |
| 2017/0184833 A1* | 6/2017 | Okamoto | .............. | G01J 3/0208 |
| 2020/0173965 A1* | 6/2020 | Sangu | ................. | G02B 17/061 |

FOREIGN PATENT DOCUMENTS

WO    2013078471 A1    5/2013

* cited by examiner

*Primary Examiner* — Isiaka O Akanbi
(74) *Attorney, Agent, or Firm* — MATTINGLY & MALUR, PC

(57) ABSTRACT

Provided is a spectrometry apparatus that suppresses a reduction in usage efficiency of an irradiation energy of a light. A spectrometry apparatus of the disclosure includes a stage on which a sample is placed, an electromagnetic source that emits an electromagnetic wave, one or a plurality of optical elements that transform a spatial energy distribution of the electromagnetic wave and emit the electromagnetic wave, and a reflective objective lens that collects the electromagnetic wave after a transformation of the spatial energy distribution and irradiates the sample with the collected electromagnetic wave.

12 Claims, 10 Drawing Sheets

SPECTROMETRY APPARATUS

CROSS REFERENCE TO RELATED APPLICATIONS

The present application claims priority from Japanese patent application JP 2022-068154 filed on Apr. 18, 2022, the entire content of which is hereby incorporated by reference into this application.

BACKGROUND

Technical Field

The present disclosure relates to a spectrometry apparatus.

Background Art

A spectroscopic analysis technique is a technique capable of analyzing a composition of a material and identifying a component of a mixed foreign material based on wavelength characteristics such as a reflectance and an absorbance of a light irradiated on the material. The spectroscopic analysis technique includes various methods such as an infrared spectroscopy, Raman spectroscopy, and NV center spectroscopy (NMR). For allowing the component analysis of various materials, it is advantageous to expand the wavelength bandwidth of the light used in the measurement. For ensuring the stability of the measurement, it is necessary that a light having a wide-range wavelength is coaxially irradiated on a measurement target. In an objective lens using a common optical lens, since a focal position shifts in an optical axis direction depending on the wavelength (chromatic aberration), a wide-band light cannot be used. Therefore, it is considered to use a reflective objective lens that does not cause the chromatic aberration.

WO 2013/078471 discloses a technique in which a sample is periodically heated with an infrared laser beam, and expansion and contraction of the sample caused thereby are measured by a confocal detector using a visible light laser. In WO 2013/078471, a reflective objective lens is used as an objective lens.

SUMMARY

However, the structure of the reflective objective lens does not allow using the light in the center of an incident light path, and since a part of the light in the peripheral area is lost, the usage efficiency of the irradiation energy of the light decreases. In WO 2013/078471, the decrease in usage efficiency of the irradiation energy of laser (light) caused by the structure of the reflective objective lens is not examined at all.

Therefore, this disclosure provides a spectrometry apparatus that suppresses a reduction in usage efficiency of an irradiation energy of a light.

A spectrometry apparatus according to this disclosure comprises a stage, an electromagnetic source, one or a plurality of optical elements, and a reflective objective lens. A sample is placed on the stage. The electromagnetic source emits an electromagnetic wave. The one or the plurality of optical elements transform a spatial energy distribution of the electromagnetic wave and emit the electromagnetic wave. The reflective objective lens collects the electromagnetic wave after a transformation of the spatial energy distribution and irradiates the sample with the collected electromagnetic wave.

Further features related to this disclosure are clarified from the descriptions of this specification and the accompanying drawings. The aspects of this disclosure can be accomplished and achieved by components and combinations of various components, and the following detailed description and the aspects of the accompanying claims. The descriptions of this specification are merely typical examples and therefore do not limit the claims or application examples of this disclosure by any means.

The spectrometry apparatus of this disclosure can suppress the reduction in usage efficiency of an irradiation energy of a light. Problems, configurations, and effects other than ones described above will be clarified in the following explanation of embodiments.

DETAILED DESCRIPTION

Figure 1:
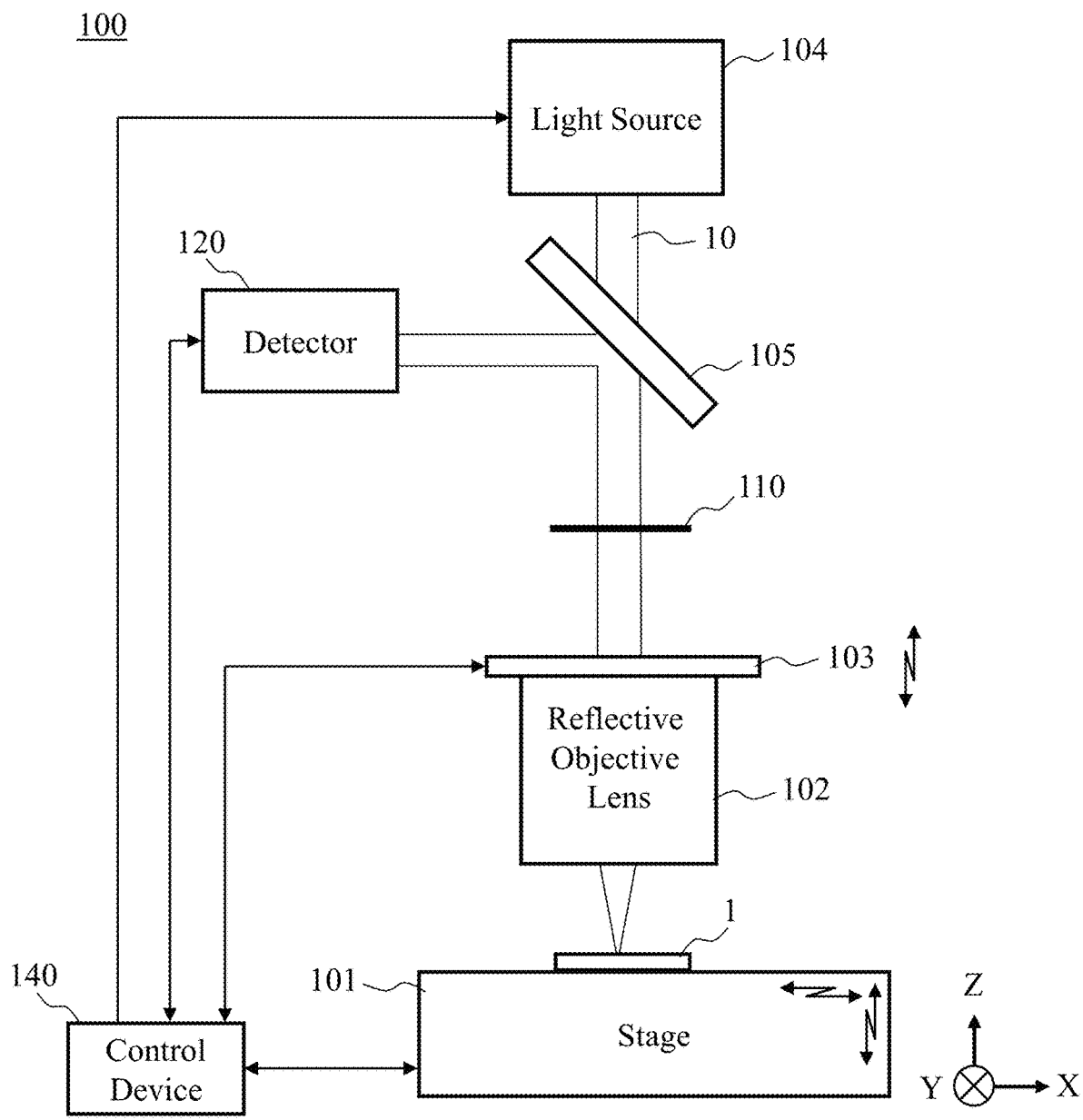
FIG. 1 is a schematic diagram illustrating an overall configuration of a spectrometry apparatus according to a first embodiment.

The following describes embodiments of the technique of this disclosure with reference to the drawings.

In the following embodiments, when necessary for the sake of convenience, the description will be given by being divided into a plurality of sections or a plurality of embodiments. Except for a case of being especially clarified, the plurality of sections or the plurality of embodiments are not mutually unrelated, and in a relation in which one is a modification, a detail, a supplemental description, or the like of a part of or all of the others.

In the following embodiments, in a case where the number and the like of an element (including a quantity, a value, an amount, a range, a size, and the like) are mentioned, except for a case of being especially clarified or a case of being clearly limited to the specific number and the like in principle, the number and the like of the element are not limited to the mentioned number and the like of the element, and may be the mentioned value or more or less.

Furthermore, needless to say, in the following embodiments, the components (including element steps and the like) are not always essential except for a case of being especially clarified or a case of being clearly essential in principle.

Similarly, in the following embodiments, when a shape, a positional relation, or the like of a component or the like is mentioned, except for a case of being especially clarified or a case of being clearly not applied in principle, the shape or the like substantially approximate or similar is included. The same applies to the above-described value and the range.

In all drawings describing the embodiments, the same reference numerals are given to the same members in principle, and repeated description thereof will be omitted. For easy understanding of the drawings, even a plan view is hatched in some cases.

First Embodiment

Exemplary Configuration of Spectrometry Apparatus

FIG. 1 is a schematic diagram illustrating an overall configuration of a spectrometry apparatus 100 according to a first embodiment. In FIG. 1, an up-down direction (vertical direction) is a Z-direction, and a horizontal direction is an X-direction and a Y-direction. The spectrometry apparatus 100 includes a stage 101, a reflective objective lens 102, a stage 103, a light source 104, a beam splitter 105, an optical element 110, a detection system 120, and a control device 140.

On the stage 101, a sample 1 is placed. The stage 101 is movable in the X-direction, the Y-direction, and the Z-direction. The stage 101 moving in the X-direction and the Y-direction allows the analysis of any region in a surface of the sample 1. The stage 101 moving in the Z-direction allows the analysis of any height region of the sample 1.

The reflective objective lens 102 is secured to the stage 103 for focus adjustment. The stage 103 is movable in the Z-direction. The focus adjustment may be performed by driving the stage 101 in the Z-direction instead of the stage 103. Use of the reflective objective lens 102 avoids the chromatic aberration that is a displacement of the focal position in an optical axis direction depending on the wavelength.

The light source 104 (electromagnetic source) emits a light beam 10 (electromagnetic wave). The light beam 10 includes, for example, lights having one or a plurality of wavelengths in a wide band from ultraviolet to infrared. The light source 104 is configured to transform the wavelength of the light beam 10 in a range of, for example, from 19 nm to 30 μm. The light beam 10 is transmitted through the beam splitter 105, passed through the optical element 110, focused by the reflective objective lens 102, and then irradiated on the sample 1. The sample 1 irradiated with the light beam 10 absorbs the provided energy, and thermally expands. The light beam 10 irradiated on the sample 1 is reflected by the surface of the sample 1, returns to the beam splitter 105 through the original optical path, and is reflected toward the detection system 120.

The optical element 110 is configured to change a spatial energy distribution of the light beam 10. The optical element 110 will be described later in detail. While FIG. 1 illustrates only one optical element as the optical element 110, a combination of a plurality of optical elements may be used.

The detection system 120 detects the light beam 10 reflected by the sample 1 and reflected by the beam splitter 105. The characteristic of the light beam 10 emitted from the light source 104 is different from the characteristic of the light beam 10 detected by the detection system 120 (another electromagnetic wave caused by the electromagnetic wave entered in the sample) in some cases. The detection system 120 outputs the detection result of the light beam 10 to the control device 140. The structure of the detection system 120 will be described later in detail.

The control device 140 can be configured by a computer device, for example, a general-purpose computer, a smartphone, a tablet terminal, or a mobile phone. The control device 140 includes a processor, a memory, a storage device, an input device, and an output device, which are not illustrated. The control device 140 is configured to control each component (including the stage 101, the stage 103, the light source 104, and the detection system 120) of the spectrometry apparatus 100. The control device 140 is configured to process the detection result of the light beam 10 received from the detection system 120 and analyzes the sample 1. The function of the control device 140 will be described later in detail.

The stage 101 and the stage 103 constitute a stage mechanism system of the spectrometry apparatus 100. The reflective objective lens 102, the beam splitter 105, and the detection system 120 constitute a measurement system of the spectrometry apparatus 100. The light source 104, the beam splitter 105, the optical element 110, and the reflective objective lens 102 constitute an optical system of the spectrometry apparatus 100. The beam splitter 105 and the reflective objective lens 102 are used in common with the measurement system. The control device 140 constitutes a control system of the spectrometry apparatus 100.

<Internal Structure of Reflective Objective Lens>

Figure 2A:
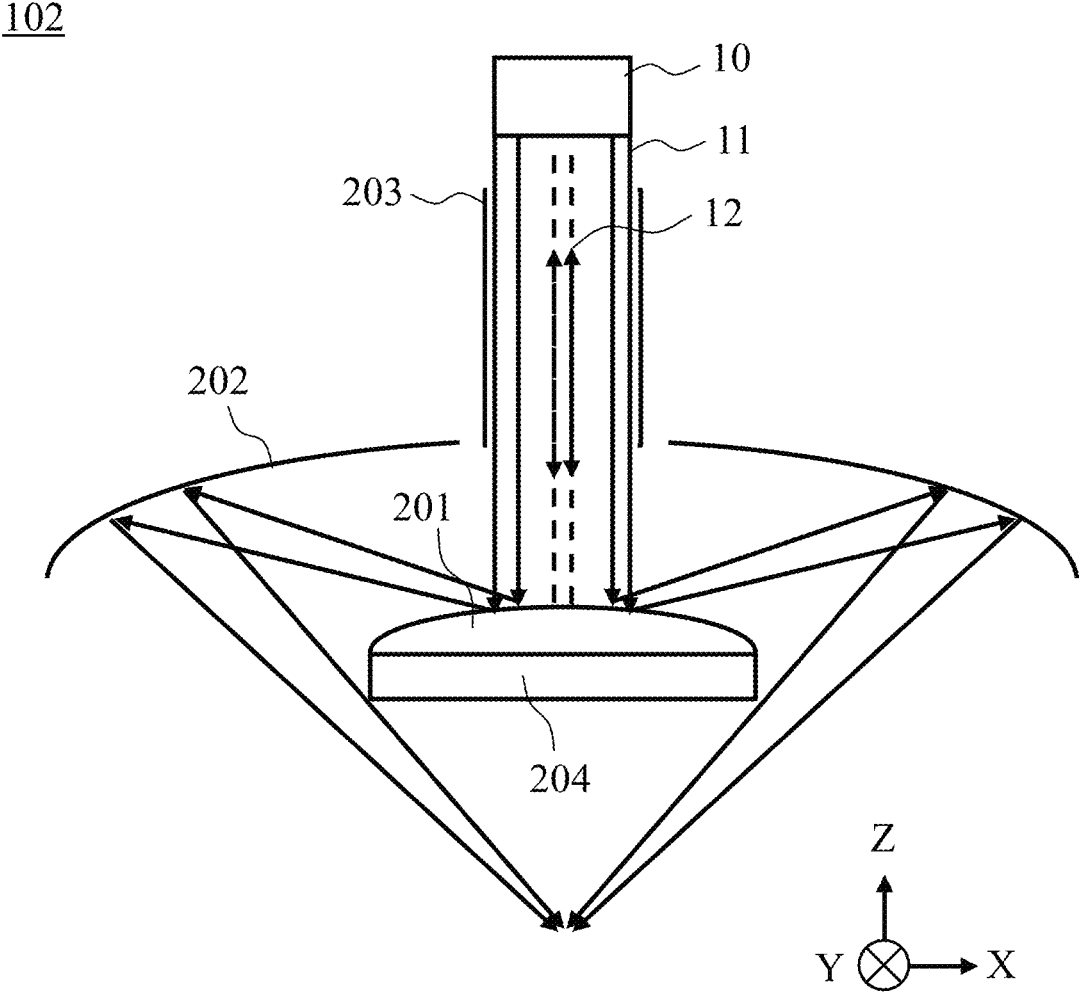
FIG. 2A is a cross-sectional view of a reflective objective lens.

FIG. 2A is a cross-sectional view of the reflective objective lens 102. The reflective objective lens 102 includes a first reflection mechanism 201, a second reflection mechanism 202, an entrance 203, and a support body 204. The first reflection mechanism 201 and the second reflection mechanism 202 only need to be elements that can reflect a light having a predetermined wavelength, and can be configured by, for example, a mirror or a reflective lens with a curved surface. The support body 204 supports the first reflection mechanism 201.

The light beam 10 enters inside of the reflective objective lens 102 from the entrance 203, and enters the first reflection mechanism 201. Conventionally, when the light beam 10 is a light beam of Gaussian distribution or uniform distribution, in the first reflection mechanism 201, the light beam 10 is split into a light beam component 11 and a light beam component 12. The light beam component 11 can be reflected toward the second reflection mechanism 202. The light beam component 12 is reflected in the center region (peripheral region of an optical axis of the reflective objective lens 102) of the first reflection mechanism 201, and cannot be reflected toward the second reflection mechanism 202. The light beam component 12 does not perform the function of irradiation, and is lost. In the first reflection mechanism 201, a dead area that is an area in which the light beam component 12 is reflected is generally 15% to 60% of an effective area of the first reflection mechanism 201. The light beam component 11 is reflected again by the second reflection mechanism 202, and collected at a predetermined focal point of the lens.

Figure 2B:
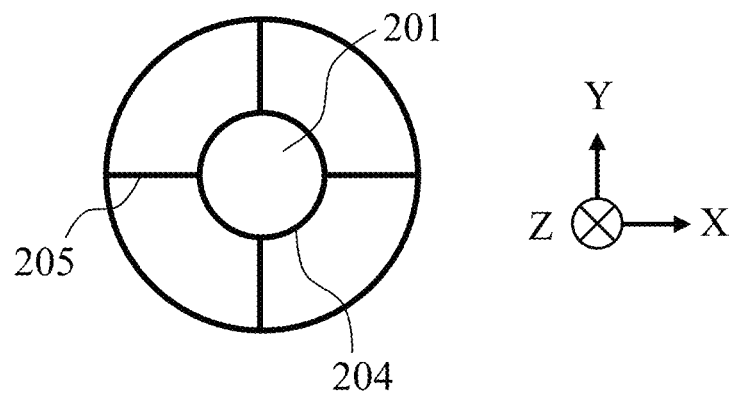
FIG. 2B is a bottom view illustrating an exemplary configuration of a support body of a first reflection mechanism.

FIG. 2B is a bottom view illustrating an exemplary configuration of the support body 204 of the first reflection mechanism 201. In the example of FIG. 2B, the support body 204 includes four arms 205 disposed radially.

Figure 2C:
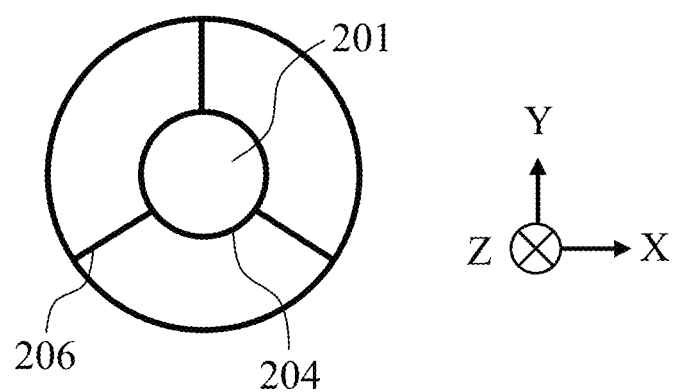
FIG. 2C is a bottom view illustrating another exemplary configuration of the support body of the first reflection mechanism.

FIG. 2C is a bottom view illustrating another exemplary configuration of the support body 204 of the first reflection mechanism 201. In the example of FIG. 2C, the support body 204 includes three arms 206 disposed radially.

<Transformation of Spatial Energy Distribution of Light Beam by Optical Element>

Conventionally, when the light beam 10 is a light beam of Gaussian distribution or uniform distribution, the arms 205 or the arms 206 of the reflective objective lens 102 block a part of the light beam component 11 reflected by the second reflection mechanism 202. Additionally, the light beam 10 entered in the center region of the first reflection mechanism 201 is lost as described above. Therefore, the usage efficiency of the irradiation energy of the light beam 10 decreases. This embodiment deals with this problem by disposing the optical element 110 on the optical path of the light beam 10. The optical element 110 changes the spatial energy distribution of the light beam 10, and distributes the energy so as to avoid the peripheral region of the optical axis of the reflective objective lens 102 and the regions corresponding to the arms. The light beam 10 with thus transformed spatial energy distribution is entered in the reflective objective lens 102, thereby allowing suppressing the reduction in usage efficiency of the irradiation energy of the light beam 10 caused by the structure of the reflective objective lens 102.

As the optical element 110, for example, an optical mode converter, a phase plate, a conical lens (axicon lens), a vortex lens, a conical mirror, a two-dimensional micron lens, a combination of a plurality of optical elements, or the like can be used. The optical mode converter, for example, is configured to is configured to convert a Gaussian beam ($TEM_{00}$ mode) into a higher order Hermite-Gaussian mode. As the combination of a plurality of optical elements, for example, a combination of a conical lens and a convex lens, or a combination of a vortex lens and a convex lens can be used.

Figure 3A:
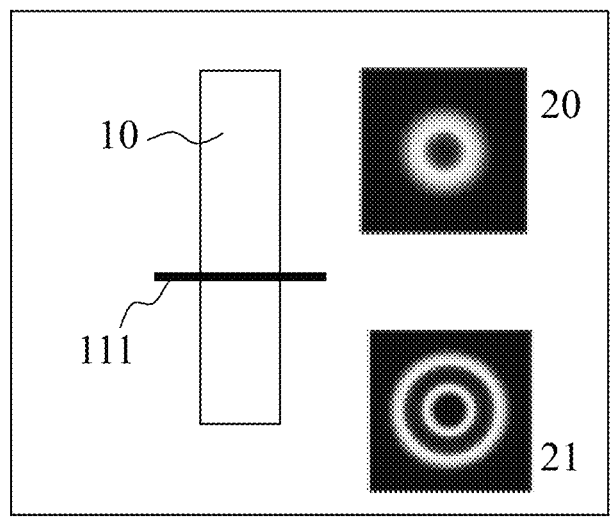
FIG. 3A is a drawing for describing an optical element that transforms a spatial energy distribution of a light beam in a ring shape.

FIG. 3A is a drawing for describing an optical element 111 that transforms the spatial energy distribution of the light beam 10 in a ring shape. In the left side of FIG. 3A, a schematic diagram of the light beam 10 and the optical element 111 is illustrated. The center of the light beam 10 enters the center of the optical element 111. In the right side of FIG. 3A, a spatial energy distribution 20 of the light beam 10 before passing through the optical element 111, and a spatial energy distribution 21 of the light beam 10 after passing through the optical element 111 are illustrated. The spatial energy distribution 20 of the light beam 10 before passing through the optical element 111 is a Gaussian beam state. That is, the energy is distributed such that the energy in the center of the light beam 10 is high, and the intensity decreases as a distance in the radial direction from the center of the light beam 10 increases. The spatial energy distribution 21 of the light beam 10 after passing through the optical element 111 is a ring shape. Thus, in the example of FIG. 3A, the optical element 111 is configured to transform the spatial energy distribution of the light beam 10 in a ring shape. As the optical element 111, for example, a conical lens, a phase plate, a vortex lens, a conical mirror, a two-dimensional micron lens, a combination of a conical lens and a convex lens, and a combination of a vortex lens and a convex lens can be used.

Figure 3B:
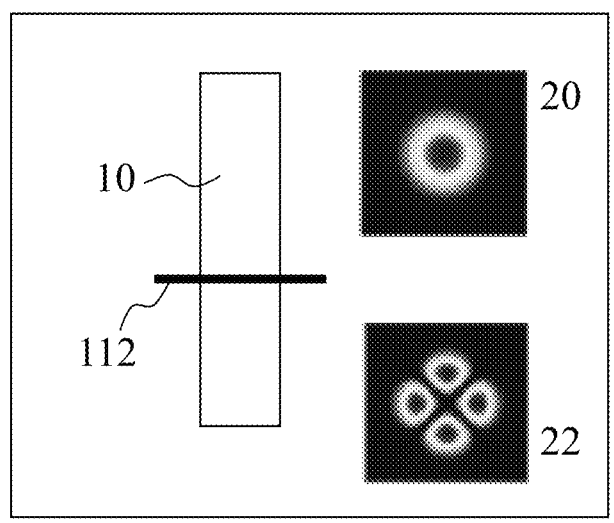
FIG. 3B is a drawing for describing an optical element that transforms the spatial energy distribution of the light beam into four divisions.

FIG. 3B is a drawing for describing an optical element 112 that transforms the spatial energy distribution of the light beam 10 into four divisions. The center of the light beam 10 enters the center of the optical element 112. A spatial energy distribution 22 of the light beam 10 after passing through the optical element 112 is a state of being divided into four in a point symmetry having the optical axis in the center (for example, light beam in $TEM_{11}$ mode). Thus, in the example of FIG. 3B, the optical element 112 is configured to transform the spatial energy distribution of the light beam 10 in a state of being divided into four. As the optical element 112, for example, an optical mode converter or the like can be used.

Figure 3C:
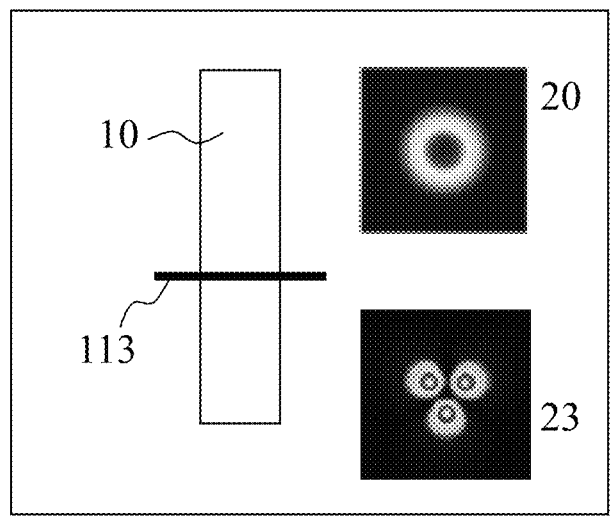
FIG. 3C is a drawing for describing an optical element that transforms the spatial energy distribution of the light beam into three divisions.

FIG. 3C is a drawing for describing an optical element 113 that transforms the spatial energy distribution of the light beam 10 into three divisions. The center of the light beam 10 enters the center of the optical element 113. A spatial energy distribution 23 of the light beam 10 after passing through the optical element 113 is a state of being divided into three having the optical axis in the center. Thus, in the example of FIG. 3C, the optical element 113 is configured to transform the spatial energy distribution of the light beam 10 in a state of being divided into three. As the optical element 113, for example, an optical mode converter or the like can be used.

As illustrated in FIGS. 3A to 3C, in the spatial energy distributions 21 to 23 after the transformation by the optical elements 111 to 113 (optical element 110), the energy is not distributed in the center portion of the light beam 10. The design of the optical elements 111 to 113 (optical element 110) (for example, position of the optical element 110, distance between a plurality of optical elements, or the like) is adjusted such that the area of the region in which the energy is not distributed corresponds to the above-described dead area of the first reflection mechanism 201 of the reflective objective lens 102. This is generalized as follows. The optical element 110 has a first region having a predetermined radius from the center of an incident surface in the incident surface, and has a second region having the predetermined from the center of an output surface in the output surface. The optical element 110 outputs the light beam 10 entered in the first region of the incident surface from a region other than the second region of the output surface. The area of the first region and the area of the second region correspond to the dead area of the first reflection mechanism 201 of the reflective objective lens 102. Accordingly, it is avoided that the energy as the above-described light beam component 12 is lost.

As illustrated in FIGS. 3B and 3C, the energy of the light beam 10 is not distributed at the positions corresponding to the four arms 205 or the three arms 206 of the reflective objective lens 102 (see FIGS. 2B and 2C) in the spatial energy distributions 22 and 23. Accordingly, blocking and losing the light by the arms 205 or the arms 206 can be avoided.

Exemplary Configuration of Detection System

Figure 4:
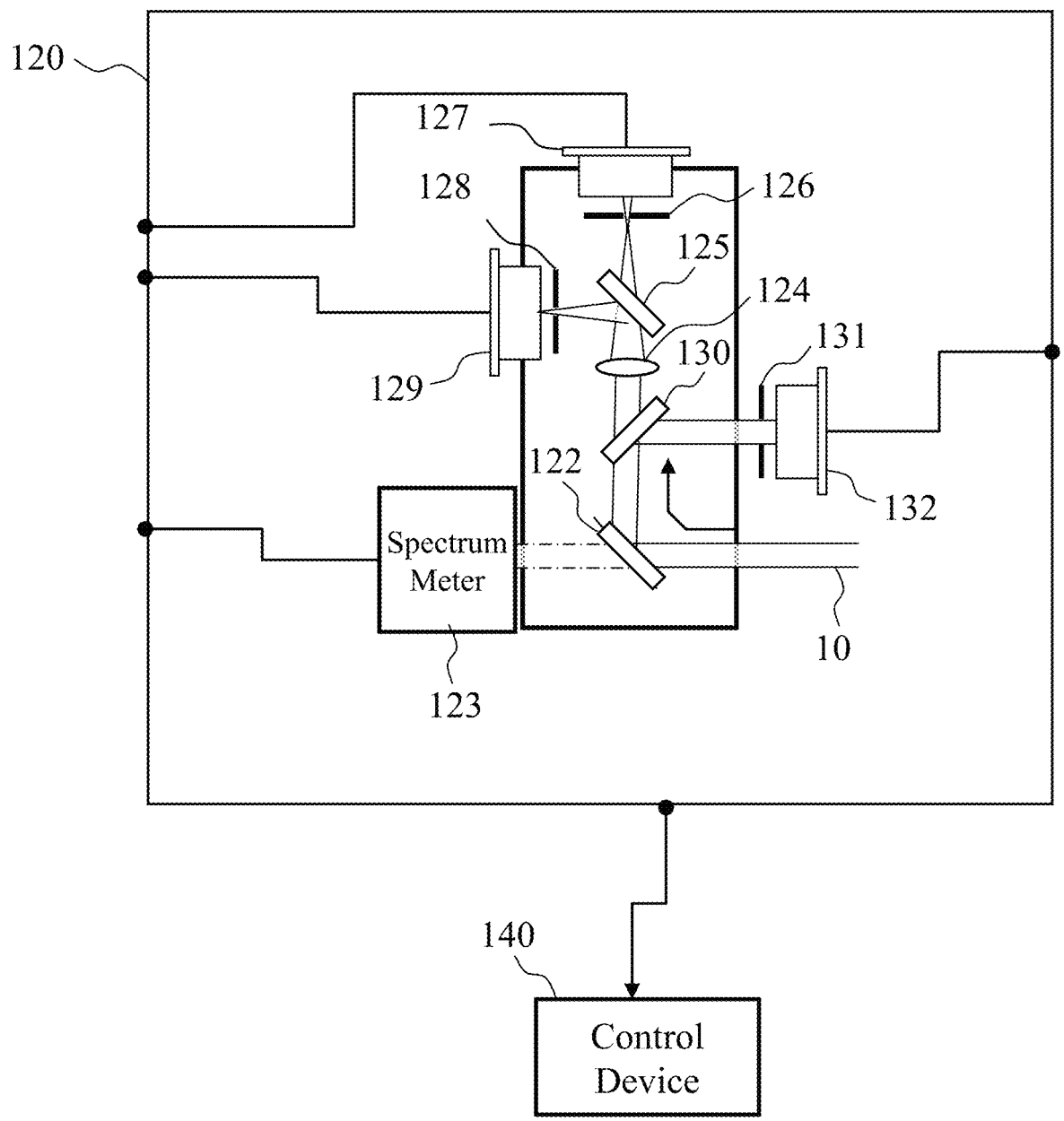
FIG. 4 is a schematic diagram illustrating a configuration of a detector.

FIG. 4 is a schematic diagram illustrating a configuration of the detection system 120. The detection system 120 includes a dichroic mirror 122, a spectrum meter 123, a condenser lens 124, a half mirror 125, a pinhole 126, an optical detector 127, a pinhole 128, an optical detector 129, a beam splitter 130, an aperture diaphragm 131, and an optical detector 132.

From the light beam 10 reflected by the surface of the sample 1 and entered in the detection system 120, a part of the light components having a wavelength different from an original wavelength is separated by the dichroic mirror 122. The part of the light components is transmitted through the dichroic mirror 122, and enters the spectrum meter 123. The other light components are reflected by the dichroic mirror 122.

The beam splitter 130 is disposed between the dichroic mirror 122 and the condenser lens 124. The beam splitter 130 reflects a part of or approximately the whole of the light beam 10 toward the aperture diaphragm 131. That is, when the beam splitter 130 is a partial reflection mirror, a part of the light beam 10 travels toward the aperture diaphragm 131, and when the beam splitter 130 is a total reflection mirror, approximately the whole light beam 10 travels toward the aperture diaphragm 131.

The optical detector 132 detects the light beam 10 passing through the aperture diaphragm 131, thereby measuring a scattering state of the surface of the sample 1.

The light component transmitted through the beam splitter 130 enters the condenser lens 124, focused, and entered in the half mirror 125. Approximately the half of the focused light beam 10 is transmitted through the half mirror 125 toward the pinhole 126, and approximately the other half is reflected by the half mirror 125 toward the pinhole 128. In the light beam 10 transmitted through the half mirror 125, the light beam 10 passing through the pinhole 126 is detected by the optical detector 127. In the light beam 10 reflected by the half mirror 125, the light beam 10 passing through the pinhole 128 is detected by the optical detector 129. The pinhole 126 and the pinhole 128 are provided at positions displaced from the focal position of the condenser lens 124. That is, the pinhole 126 is provided at the position apart from the focal position of the condenser lens 124 in a direction away from the sample 1 by a distance L. The pinhole 128 is provided at the position apart from the focal position of the condenser lens 124 in a direction approaching the sample 1 by the distance L.

The configuration of the detection system 120 is not limited to the above-described configuration, and can be changed as necessary. It is not necessary that the spectrum meter 123 and the optical detectors 127, 129, and 132 are all disposed, and one or more only needs to be disposed. As the optical detectors 127, 129, and 132, one that can convert photons into a current or a voltage signal, for example, a photodiode (PD), an avalanche photodiode (APD), a photomultiplier tube (PMT), a CCD sensor, or a CMOS sensor, can be used.

<Function of Control Device>

Figure 5:
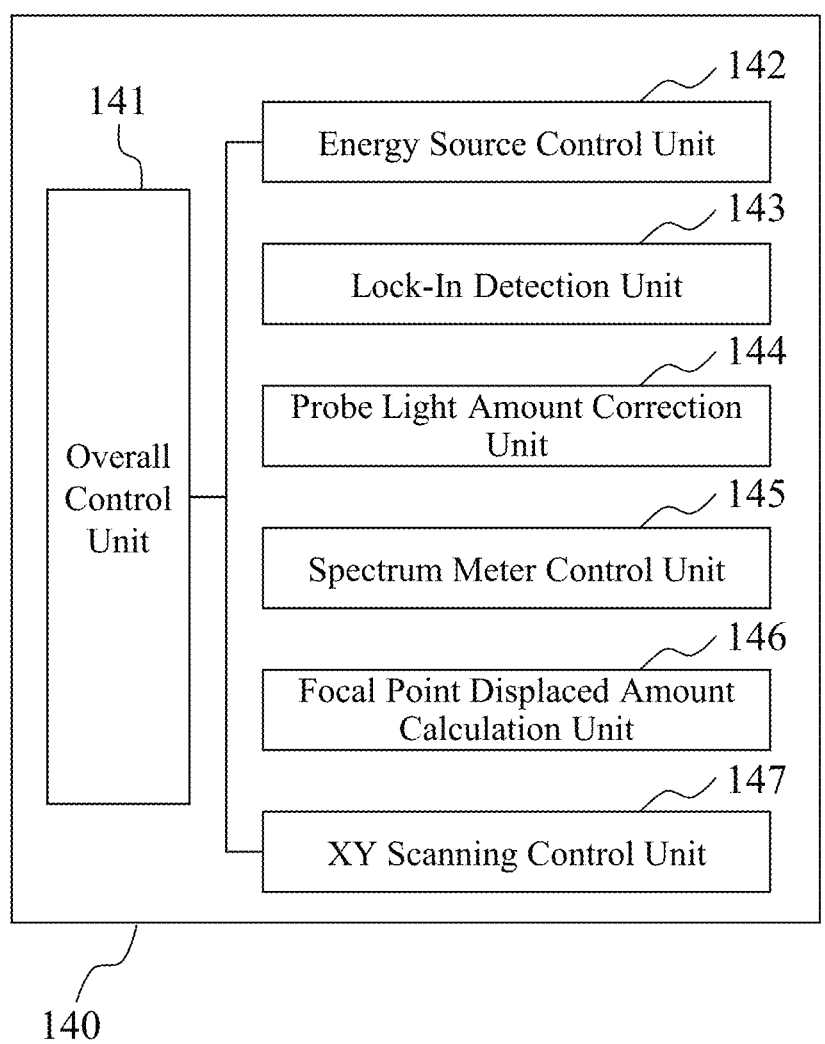
FIG. 5 is a function block diagram of a control device.

FIG. 5 is a function block diagram of the control device 140. The control device 140 includes an overall control unit 141, an energy source control unit 142, a lock-in detection unit 143, a probe light amount correction unit 144, a spectrum meter control unit 145, a focal point displaced amount calculation unit 146, and an XY scanning control unit 147. The functions of the respective units of the control device 140 can be achieved by executing programs stored in the memory by the processor.

The overall control unit 141 is a computing unit that controls each unit and processes and transmits data generated in each unit. The overall control unit 141 can be configured by, for example, a Central Processing Unit (CPU) or a Micro Processing Unit (MPU). Each of the units other than the overall control unit 141 may be configured by dedicated hardware, for example, using Application Specific Integrated Circuit (ASIC) or Field-Programmable Gate Array (FPGA), and may be configured by software operated on the computing unit.

The energy source control unit 142 controls the wavelength, the intensity, and the like of the light beam 10 emitted from the light source 104. By scanning the wavelength, an absorption spectrum of the sample 1 can be measured. By modulating the intensity of the light beam 10, a lock-in detection by the lock-in detection unit 143 described later can be performed.

The lock-in detection unit 143 detects a detection light amount of the optical detector 127 and a detection light amount of the optical detector 129 by comparing with a modulation signal transmitted from the energy source control unit 142, thus performing what is called a lock-in detection.

Instead of the lock-in detection, what is called an AM detection in which a displacement signal corresponding to a modulation frequency of the light beam 10 is extracted by a filter, and then an amplitude is measured may be employed. Additionally, a spectral analysis of the displacement signal using FFT or the like may be performed to measure an intensity of a spectrum peak corresponding to the modulation frequency. Further, other common amplitude detection methods may be employed.

The probe light amount correction unit 144 monitors and corrects an output in the detection of the intensity of the light beam 10.

The spectrum meter control unit 145 executes a parameter adjustment and a signal recovery of the spectrum meter 123.

The focal point displaced amount calculation unit 146 drives the stage 101 or the stage 103 to control the position in the Z-direction of the reflective objective lens 102. Controlling the position in the Z-direction of the reflective objective lens 102 allows the light beam 10 to follow the unevenness of the surface of the sample 1.

The XY scanning control unit 147 moves the stage 101 or the stage 103 in the X-direction and the Y-direction. Moving the stage 101 or the stage 103 allows the light beam 10 to be irradiated on any position of the sample 1, thus allowing a two-dimensional planar spectroscopic measurement on the surface of the sample 1. Alternatively, combining with the stage 101 or 103 movable in the Z-axis allows a light measurement of a three-dimensional body.

Summary of First Embodiment

As described above, the spectrometry apparatus 100 according to the first embodiment includes the stage 101 on which the sample 1 is placed, the light source 104 (electromagnetic source) that emits the light beam 10 (electromagnetic wave), the optical element 110 (one or a plurality of optical elements) that transforms the spatial energy distribution of the light beam 10 and emits the light beam 10, and the reflective objective lens 102 that collects the light beam 10 after a transformation of the spatial energy distribution and irradiates the sample 1 with the light beam 10. Thus, by transforming the spatial energy distribution of the light beam 10 entering the reflective objective lens 102, the reduction in usage efficiency of the irradiation energy of the light beam 10 caused by the structure of the reflective objective lens 102 can be suppressed. Consequently, the detection sensitivity of the light beam 10 reflected by the sample 1 can be improved.

Additionally, a light source of relatively low-price and low power can be used as the light source 104, and it leads to cost reduction.

Second Embodiment

In the above-described first embodiment, the configuration in which the beam splitter 105 is disposed before the optical element 110 is described. The position of the beam splitter 105 is not limited to before the optical element 110. Therefore, in the second embodiment, a configuration in which the position of the beam splitter 105 is changed will be described.

Exemplary Configuration of Spectrometry Apparatus

Figure 6:
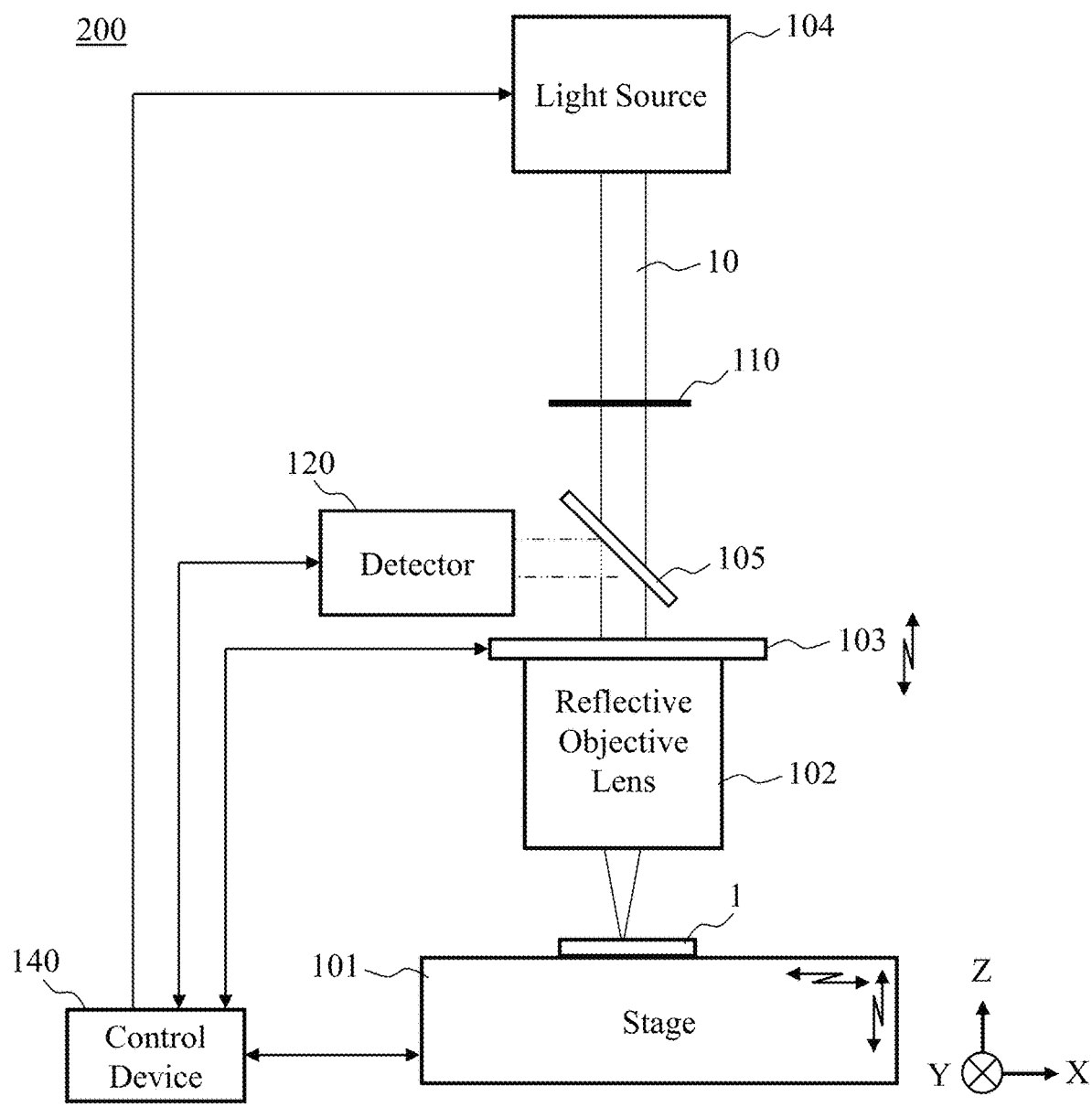
FIG. 6 is a schematic diagram illustrating an overall configuration of a spectrometry apparatus according to a second embodiment.

FIG. 6 is a schematic diagram illustrating an overall configuration of a spectrometry apparatus 200 according to the second embodiment. In FIG. 6, the beam splitter 105 is disposed after the optical element 110. Accordingly, since the light component reflected by the sample 1 directly enters the detection system 120 without passing through the optical element 110, the loss of the light due to the optical element 110 can be reduced. Since the other configurations are the same as those of the spectrometry apparatus 100 in the first embodiment (FIG. 1), the explanation is omitted.

Third Embodiment

In the first embodiment, the spectrometry apparatus 100 including the only one light source 104 is described. In the third embodiment, a configuration including a plurality of light sources will be described.

Exemplary Configuration of Spectrometry Apparatus

Figure 7:
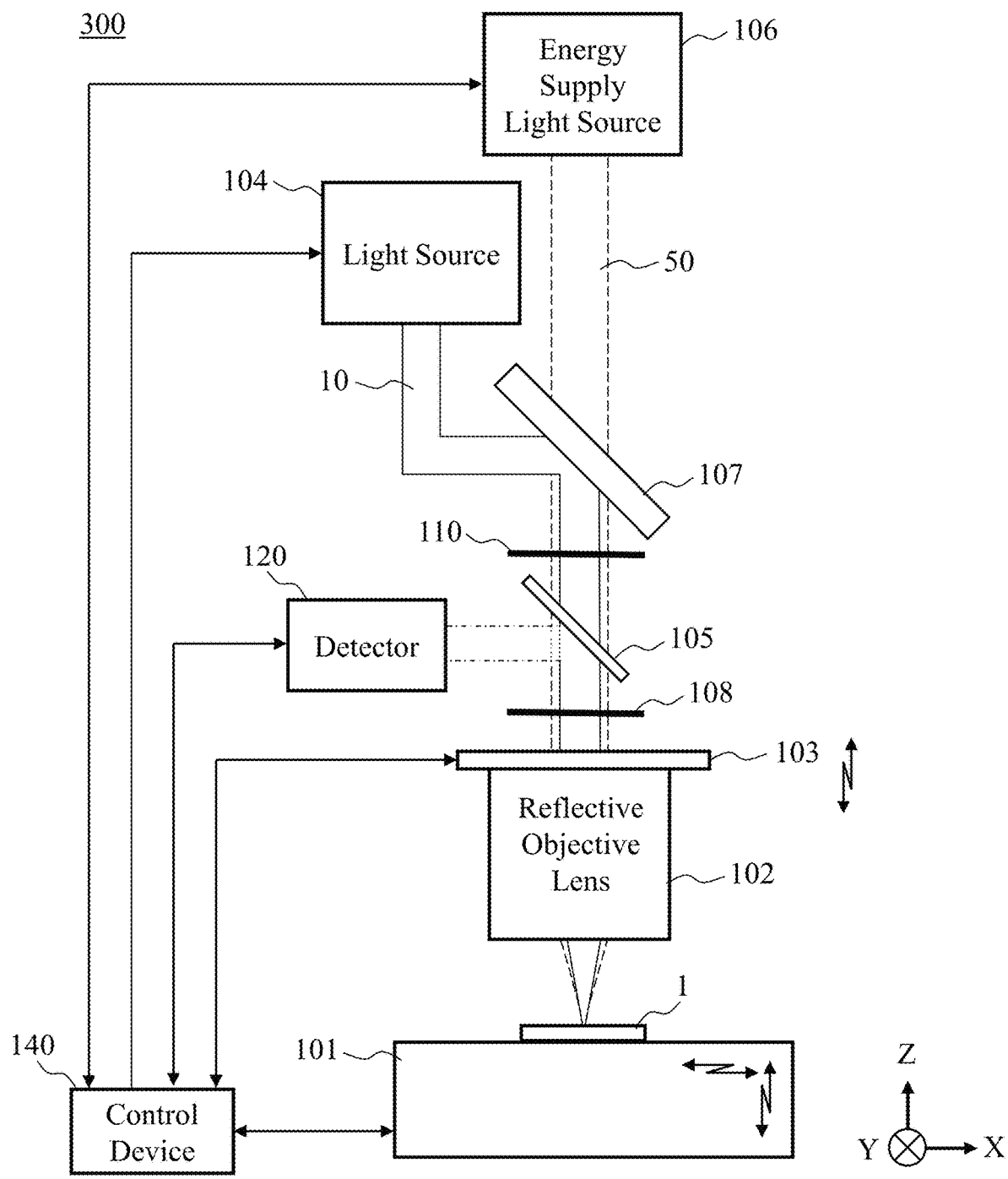
FIG. 7 is a schematic diagram illustrating an overall configuration of a spectrometry apparatus according to a third embodiment.

FIG. 7 is a schematic diagram illustrating an overall configuration of a spectrometry apparatus 300 according to the third embodiment. The spectrometry apparatus 300 further includes an energy supply light source 106, a dichroic mirror 107, and a space filter 108. The other configurations are the same as those in the spectrometry apparatus 100 of the first embodiment.

The energy supply light source 106 (electromagnetic source, energy source) emits an energy beam 50 (electromagnetic wave) for providing an energy to the sample 1. The wavelength of the energy beam 50 may be, for example, 19 nm to 30 µm. Especially, the energy beam 50 can be, for example, an infrared beam. The energy beam 50 is transmitted through the dichroic mirror 107, passed through the optical element 110, focused by the reflective objective lens 102, and then irradiated on the sample 1. The sample 1 irradiated with the energy beam 50 absorbs the provided energy, and causes a physical phenomenon such as a thermal expansion and a magnetic property. To measure the physical phenomenon occurred in the sample 1, the light beam 10 (measurement electromagnetic wave) emitted from the light source 104 is set to an electromagnetic wave with which a physical property value of the sample 1 can be measured. The wavelength of the light beam 10 can be, for example, from 19 nm to 2 µm. The light beam 10 is reflected by the dichroic mirror 107 toward the reflective objective lens 102. In the light beam 10 reflected by the dichroic mirror 107, the spatial energy distribution is transformed by the optical element 110, and the light in a predetermined wavelength region is filtered by the space filter 108, focused by the reflective objective lens 102, and then irradiated on the sample 1.

The light beam 10 reflected by the sample 1 passes through the space filter 108, is reflected by the beam splitter 105, and enters the detection system 120. By using one that eliminates the light in the wavelength region not targeted for detection in the light beam 10 as the space filter 108, an S/N ratio in the detection system 120 can be improved. A multifocal lens can be used instead of the space filter 108 or in combination with the space filter 108. The space filter 108 or the multifocal lens is not necessarily disposed. The space filter 108 and the multifocal lens can be disposed similarly in the spectrometry apparatus 100 of the first embodiment and the spectrometry apparatus 200 of the second embodiment.

Figure 8:
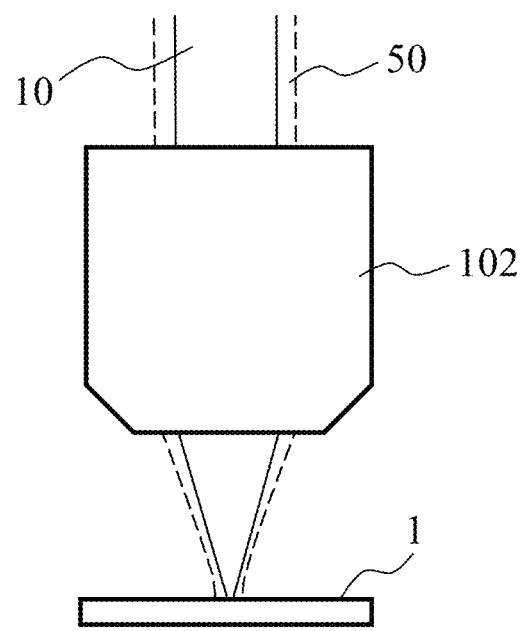
FIG. 8 is a drawing for describing an energy beam and a light beam irradiated on a sample.

FIG. 8 is a drawing for describing the energy beam 50 and the light beam 10 irradiated on the sample 1. As described above, the energy beam 50 and the light beam 10 are both focused by the reflective objective lens 102 and irradiated on the sample 1. The light beam 10 has a beam diameter smaller than that of the energy beam 50, and irradiated on a region narrower than a region irradiated with the energy beam 50. This allows measuring the physical property value of the region irradiated with the energy beam 50 with a high spatial resolution. Especially, when the light beam 10 is a visible light beam, the spatial resolution in the measurement becomes less than about 1 µm. As the measurement system, a confocal detector can be used.

Summary of Third Embodiment

As described above, the spectrometry apparatus 300 according to the third embodiment includes the energy supply light source 106 and the light source 104 as the light sources, and the energy beam 50 that causes the physical phenomenon in the sample 1 and the light beam 10 for measuring the physical property value of the sample 1 are irradiated on the sample 1. The spatial energy distributions of both the energy beam 50 and the light beam 10 are transformed by the optical element 110, and the energy beam 50 and the light beam 10 can be irradiated on the center region of the optical axis of the reflective objective lens 102 and the region avoiding the region in which the arms are provided. Accordingly, the reduction in energy efficiency of both the energy beam 50 and the light beam 10 can be suppressed.

[Modification]

The present disclosure is not limited to the above-described embodiments and includes various modifications. For example, the above-described embodiments have been explained in detail for easy understanding of the description of the present disclosure, and does not necessarily include all the explained configurations. A part of one embodiment can be replaced with a configuration of another embodiment. A configuration of one embodiment can be added to a configuration of another embodiment. Additionally, for a part of the configurations in the respective embodiments, a part of a configuration of another embodiment can be added, deleted, or replaced.

DESCRIPTION OF SYMBOLS

1 Sample
10 Light beam
20 to 23 Spatial energy distribution
100, 200, 300 Spectrometry apparatus
110 Optical element

What is claimed is:

1. A spectrometry apparatus comprising:
a stage on which a sample is placed;
an electromagnetic source that emits an electromagnetic wave;
one or a plurality of optical elements that transform a spatial energy distribution of the electromagnetic wave into multiple divisions and emit the electromagnetic wave; and
a reflective objective lens that collects the electromagnetic wave after the transformation of the spatial energy distribution and irradiates the sample with the collected electromagnetic wave, the reflective objective lens including a first reflection mechanism and a second reflection mechanism, which are independent from the one or plurality of optical elements,
wherein the reflective objective lens includes a support body having multiple arms disposed radially that support the first reflection mechanism,
wherein the one or plurality of optical elements transform the spatial energy distribution of the electromagnetic wave into the multiple divisions that correspond to the multiple arms of the support body.

2. The spectrometry apparatus according to claim 1,
wherein the one or the plurality of optical elements transform the spatial energy distribution to cause the electromagnetic wave to enter the reflective objective lens in a manner of avoiding a peripheral region of an optical axis of the reflective objective lens and a region of the support body.

3. The spectrometry apparatus according to claim 1,
wherein the one or the plurality of optical elements:
have a first region defined by a predetermined radius from a center of an incident surface in the incident surface, and have a second region defined by the predetermined radius from a center of an output surface in the output surface; and
output the electromagnetic wave entered in the first region from a region other than the second region of the output surface.

4. The spectrometry apparatus according to claim 1,
wherein the electromagnetic source includes a plurality of light sources, and
wherein the plurality of light sources include an energy source that irradiates a predetermined region of the sample with an energy beam, and a measurement electromagnetic source that irradiates the sample with a measurement electromagnetic wave.

5. The spectrometry apparatus according to claim 3,
wherein the support body has four arms disposed radially, and
wherein the one or the plurality of optical elements are configured to transform the spatial energy distribution of the electromagnetic wave into four divisions that correspond to the four arms.

6. The spectrometry apparatus according to claim 1,
wherein the one or the plurality of optical elements include an axicon lens, a phase plate, a vortex lens, a conical mirror, a two-dimensional micron lens, or an optical mode converter.

7. The spectrometry apparatus according to claim 1,
wherein the electromagnetic source is configured to transform a wavelength of the electromagnetic wave from 19 nm to 30 μm.

8. The spectrometry apparatus according to claim 4,
wherein the energy source is configured to emit the energy beam having a wavelength of from 19 nm to 30 μm.

9. The spectrometry apparatus according to claim 4,
wherein the measurement electromagnetic source is configured to emit the measurement electromagnetic wave having a wavelength of from 19 nm to 2 μm.

10. The spectrometry apparatus according to claim 1, further comprising
a driving device that drives the stage or the reflective objective lens to change a relative position between the sample and the reflective objective lens in a three-axis direction.

11. The spectrometry apparatus according to claim 1, further comprising
a detector that detects another electromagnetic wave caused by the electromagnetic wave entered in the sample.

12. The spectrometry apparatus according to claim 11, further comprising
a space filter or a multifocal lens disposed before the detector.

* * * * *